Figure 1:
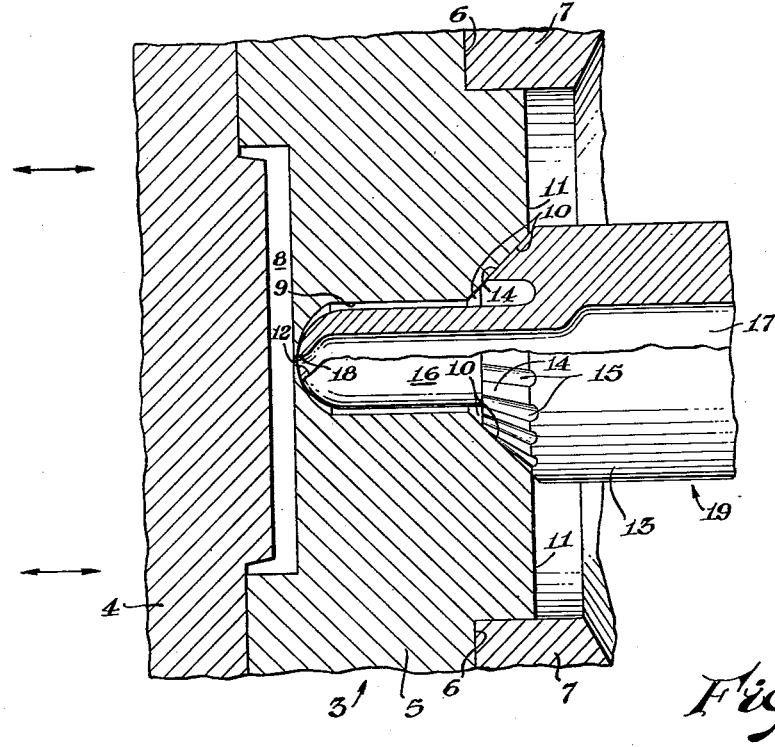

Dec. 3, 1957  R. B. McKEE, JR  2,814,831
INJECTION MOLDING APPARATUS
Filed Dec. 27, 1955

INVENTOR.
Robert B. McKee, Jr.
BY
Griswold & Burdick
ATTORNEYS

United States Patent Office 2,814,831
Patented Dec. 3, 1957

2,814,831

INJECTION MOLDING APPARATUS

Robert B. McKee, Jr., Midland, Mich., assignor to The Dow Chemical Company, Midland, Mich., a corporation of Delaware Application December 27, 1955, Serial No. 555,634

6 Claims. (Cl. 18—30)

This invention relates to an improved molding apparatus which is especially well suited for ameliorating the technique of injection molding thermoplastic materials. It has particular reference to an apparatus which is adapted to provide substantially sprueless injection moldings.

In conventional practice for injection molding materials of thermoplastic nature, a sprue bushing is employed to direct and conduct the supply of molten material from the injection nozzle to the mold gate or entrance into the mold cavity. This results in formation of a sprue, usually formed on an injection molding, which is the dross material solidified within the mold gate and sprue bushing. The primary purpose and familiar function of a sprue is to afford a means for thermally separating the supply of hot, molten material in the injection nozzle from the relatively cooler material which is solidifying in the mold cavity. In this way, physically defective or deficient portions may be avoided in the molded article and the molding procedure is uncomplicated by requirements to closely regulate temperatures.

Although good moldings are obtainable in this manner, it is widely appreciated that the presence of sprues is frequently causative of various well known difficulties. For instance, inasfar as the normal functional utility of the molded article is concerned, a sprue is rarely representative of other than useless and wasted material. Further, the design of injection moldings is often complicated by requirements to position the sprue in a relatively inconspicuous or unobjectionable manner. On many articles it cannot be suitably positioned in order to preclude its removal. Thus, additional expense for sprue trimming operations is often occasioned in the manufacture of injection molded articles.

While apparatus are known and techniques are employed for minimizing the normal elongate and protrudent characteristics of sprues on injection moldings, unqualified success and consummate satisfaction for all purposes has not been realized. Thus, in certain known injection molding apparatus, the sprue bushing has been eliminated by employment of an injection nozzle and mold combination in which the nozzle is adapted to press directly against and discharge directly into the mold gate with the entire nozzle thrust being borne by the segment of the mold wall in the immediate vicinity of the gate. This, however, serves merely to minimize, but does not eliminate, the sprue. Although it is foreshortened in such apparatus, a sprue, nonetheless, is formed with a size or length which is equivalent to the wall thickness of the mold in the immediate vicinity of the gate. Due to the tremendous forces that are exerted by the injection nozzle, which is pressed into sealing contact against the mold during injection by an hydraulic cylinder or the like, the sprue-determining wall must have adequate thickness for its needed strength. As a result, the size of the sprue remains of considerable proportion. In addition, such apparatus has introduced an additional operational difficulty. Alignment of the injection nozzle with the mold gate is frequently not an easy accomplishment when the sprue bushing is deleted in this manner. In other known apparatus the sprue is practically eliminated by, in effect, employing the front tip of the nozzle, which is inserted through the gate, to form part of the mold wall. Such apparatus, however, leaves an objectionable nozzle mark on the molded article and requires an extremely exacting and difficult control of temperature for successful operation.

It would be particularly desirable and extremely advantageous for an apparatus to be available for producing substantially sprueless injection moldings. It would be additionally beneficial if such an apparatus were conveniently and expediently adaptable for employment without contributing to operational difficulties as, for example, in the way of difficult alignment and the like or in overexacting requirements for precise regulation of temperature.

These and other advantageous results and purposive benefits may be achieved with apparatus in accordance with the present invention which comprises, in combination, a mold, adapted for injection molding, having a front and rear wall; a shallow gate in the front wall; a recess in the front wall providing access to said gate; and an injection nozzle having a peripheral shoulder, said shoulder being adapted to abut against and engage said front wall in said recess to align and support said nozzle against said mold while said nozzle is seated in sealing contact on said front wall in the vicinity of said gate.

Figure 2:
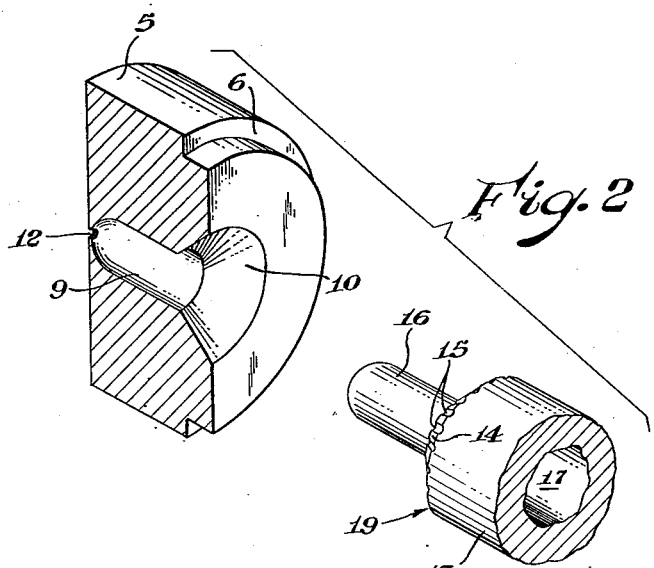

Further features and advantages of the invention will be more apparent in the following description and specification, taken in connection with the drawing, wherein:

Figure 1 is an elevation of a mold, in section, and a cooperating injection nozzle, partly in section, in accordance with the present invention; and Figure 2 is a perspective representation of part of the mold, in section, and the disengaged nozzle.

There is shown in Figure 1 a mold and injection nozzle, generally indicated by the reference numerals 3 and 19 respectively, in a combined, cooperating, injecting relationship. The circular mold 3 is comprised of a cope or front section or wall 5 and a drag or rear section or wall 4. The rear wall 4 is movable relative to the stationary front wall 5, as indicated by the directional arrows, in a conventional manner in order to open the mold for release of molded articles and to close the mold to form the mold cavity 8 in which the injected thermoplastic material solidifies to a desired molded shape. The front wall 5 of the mold 3, in section, and the injection nozzle 19 (which, for simplicity and convenience, is broken off to depict only its front portion) are perspectively shown out of engagement in Figure 2 to assist in comprehension of the invention.

The mold 3 is mounted on a platen ring 7, shown partially, which is peripherally fastened or fixed by suitable means (not shown) around an indented edge rim 6 formed in the front wall 5 of the mold. A shallow gate 12 is centrally provided in the front wall 5 to pass molten, thermoplastic material from the injection nozzle 19 into the mold cavity 8. As is apparent, the gate need not be in a central position but may be provided at any desired location in the mold wall. The segment of the front wall 5 surrounding the gate is relatively thin and pressure-flexible as a result of the positioning of the gate 12 at the terminal end of a recess 9 in the front wall of the mold. The female recess 9 opens out on the outer surface 11 of the front wall 5 to provide access to the gate 12 for the male extension portion or spout 16 which projects from the injection nozzle 19. Preferably, the spout 16 is cylindrical with a rounded or hemispheral tip which seats against the front wall 5. Advantageously, the female recess 9 is cylindrical and hemisphered at its inner or terminal end surrounding the gate 12 to closely conform to the insertable nose or spout 16 of the injection nozzle 19 so that a minimized seating area is obtained. The recess 9 is also bevel-edged at its outer or opening end on the surface 11. The chamfered or beveled opening end of the recess 9 constitutes a bearing surface 10 on the mold 3 for engaging and essentially restraining the nozzle 19 to absorb the bulk of the generated thrust when the nozzle is forced in sealing contact against the mold by an hydraulic cylinder or ram or equivalent means (not shown) during injection. Although it may be otherwise formed, the cylindrical shape of the recess 9 not only permits closer conformation to the preferred type of nozzle but conveniently permits the bearing surface 10 to be frusto-conical. In this contour the surface 10 is well adapted for aligning the injection nozzle 19 with the gate 12.

The injection nozzle 19 is provided with a circumferential shoulder 14 which separates the projecting spout 16 from the enlarged barrel or stock 13 of the nozzle. The shoulder 14 is shaped to conform, preferably with the same angle of taper, to the bearing surface 10 of the recess 9. The shoulder 14 may advantageously be longitudinally (or otherwise) slotted to provide grooves 15 for minimizing the heat conducting area of contact on the surface 10. As is apparent, the rounded tip of the spout 16 has a smaller radius than the hemisphered inner or terminal end of the recess 9, the respective radii being in relative correspondence to the cylindrical proportions of the spout and recess. The spout 16 is of a suitable length, commensurate with the depth of the recess 9, to be seated in relatively light engagement with the gate-surrounding surface portion of the front wall 5 at the terminal end of the recess 9 when the nozzle is fully inserted in the recess. As mentioned, the brunt of the nozzle thrust and aligning load is absorbed by the conical bearing surface which engages the nozzle shoulder 14 and automatically positions and aligns the nozzle so that the effusive opening or port 18 at the tip of the spout 16 is over and in abutting communication with the gate 12 in order to efficiently transmit and discharge the molten material being injected through the central longitudinal passageway 17 in the nozzle.

A progressively more impervious and effective sealing contact is obtained between the front wall 5 of the mold and the seated, rounded tip of the spout 16 during the injection of material into the mold. This is due to the convexity assumed by the relatively thinner, pressure-flexible segment of the front wall 5 surrounding the gate 12 at the terminal end of the recess 9 as it is distended by the increasing pressure in the filling mold cavity 8 to be forced into continuously tighter engagement with the spout. The direct conducted heat loss from the nozzle to the mold is minimized, however, due to the minimum contact area required for seating the nozzle tip in sealing contact on the mold.

The thrust absorbing bearing surface 10 in the mold and nozzle combination of the present invention permits the relatively thin front wall section to be employed in the vicinity of the gate 12 since the requirements for structural strength in the gate-surrounding portion of the wall are greatly diminished. As a consequence, extremely shallow gates can be constructed in the mold. Frequently, for example, a gate may be employed which has a depth in the neighborhood of about 0.03125 inch, and even less. This of course facilitates the manufacture of injection moldings having drastically reduced and often nearly flat and imperceptible sprues.

In operation, the mold 3 is closed and the spout 16 of the injection nozzle 19 is thrust into an operating position within the recess 9. The frusto-conical bearing surface 10 engages the nozzle shoulder 14 to assume the bulk of the generated thrust and automatically effects alignment of the discharge port 18 on the nozzle tip with the gate 12. During injection of the molten material into the mold cavity 8, the segment of the front wall 5 surrounding the gate is forced by the developed pressure in the mold cavity into sealing contact with the tip of the spout 16. The balance of the operation can be performed conventionally. Injection moldings which are substantially sprueless and which have nearly flat and imperceptible sprues can be readily obtained with apparatus according to the present invention. The apparatus can be successfully operated for extended periods of months without difficulties being caused by misalignment, leakage or "freeze ups" due to slight variations in operating temperature.

The temperature control which is required during operation of the apparatus of the present invention is not a great deal more critical than that which is required in conventional molding operations wherein sprue bushings are employed and is much less exacting than that necessary to successfully operate other known types of sprue minimizing injection molding apparatus. Care should be taken to avoid overheating the molten material in the nozzle so that it is not caused to flow excessively and produce stringing at the end of the molding cycle. If desired, the recess 9 may be suitably dimensioned relative to the nozzle tip to permit placing heaters about the tip to assist in temperature regulation. In this connection, it is usually preferable for both the recess and nozzle tip to be cylindrically shaped, although they may assume other configurations.

The apparatus of the present invention is especially suitable for employment in the manufacture of relatively flat-bottomed or dish-like articles and for other molded objects on which sprues are especially awkward and intolerable appendages. As is apparent the apparatus is susceptible of being embodied with various alterations and modifications from that which has been described in the preceding description and specification. For this reason it is to be fully understood that all of the foregoing is merely intended to be illustrative and is not to be construed or interpreted as being restrictive or otherwise limiting of the present invention excepting as it is set forth and defined in the appended claims.

What is claimed is:

1. In combination, a mold adapted for injection molding and having a front and rear wall; a recess in the surface of the front wall having an inner end to provide a relatively thin and pressure-flexible segment in said front wall at said end; a shallow gate in the front wall at the inner end of said recess; and an injection nozzle having a spout, insertable in said recess, projecting from a peripheral shoulder on said nozzle, said spout being commensurate in length with the depth of said recess; said shoulder being adapted to abut against and engage said front wall in said recess to align and support said nozzle against said mold while said nozzle spout is seated in sealing contact on said front wall at the inner end of said recess and said nozzle is in communication with said gate.

2. In combination, a mold adapted for injection molding and having a front and rear wall; a recess in the front wall having an hemisphered inner end to provide a relatively thin and pressure-flexible segment in said front wall at said inner end; a shallow gate in the front wall at the inner end of said recess; and an injection nozzle having a spout, insertable in said recess, projecting from a peripheral shoulder on said nozzle; a hemispheral tip on said spout, said spout being commensurate in length with the depth of said recess; said shoulder being adapted to abut against and engage said front wall in said recess to align and support said nozzle against said mold while the tip of said nozzle spout is seated in sealing contact on said front wall at the inner end of said recess and said nozzle is in communication with said gate.

3. In combination, a mold adapted for injection molding having a front and rear wall; a cylindrical recess in the front wall of said mold; a hemisphered inner terminal end in said recess providing a relatively thin and pressure-flexible segment in said front wall at said inner terminal end; a chamfered bevel-edge at the outer opening end of said recess to provide a bearing surface in said front wall; a shallow gate in the front wall at the inner end of said recess; and an injection nozzle having a cylindrical spout, insertable in said recess, projecting from a circumferential shoulder on said nozzle; a hemispherical tip on said spout, said spout being commensurate in length with the depth of said recess; said shoulder being adapted to abut against and engage the bearing surface in said front wall to align and support said nozzle against said mold while the tip of said nozzle spout is seated in sealing contact on said front wall at the inner end of said recess and said nozzle is in communication with said gate.

4. In combination, a mold adapted for injection molding having a front and rear wall; a cylindrical recess in the front wall of said mold; a hemisphered inner end in said recess providing a relatively thin and pressure-flexible segment at said inner end; a chamfered bevel-edge at the outer opening end of said recess to provide a frusto-conical bearing surface in said front wall; a shallow gate in the front wall at the inner end of said recess; and an injection nozzle having a cylindrical spout, insertable in said recess, projecting from a frusto-conical circumferential shoulder on said nozzle, said shoulder being tapered in conformance with said bearing surface; a hemispherical tip on said spout, said spout being commensurate in length with the depth of said recess, said shoulder being adapted to abut against and engage the bearing surface in said front wall to align and support said nozzle against said mold while the tip of said nozzle spout is seated in sealing contact on said front wall at the inner end of said recess and said nozzle is in communication with said gate.

5. The combination of claim 4 wherein said circumferential shoulder has a longitudinally grooved surface.

6. The combination of claim 4 wherein the depth of the gate is in the neighborhood of about 0.03125 inch.

References Cited in the file of this patent

UNITED STATES PATENTS

| | | |
|---|---|---|
| 2,442,607 | Leguillon et al. | June 1, 1948 |
| 2,519,255 | Knowles | Aug. 15, 1950 |

FOREIGN PATENTS

| | | |
|---|---|---|
| 1,105,967 | France | July 13, 1955 |